Patented Oct. 8, 1929

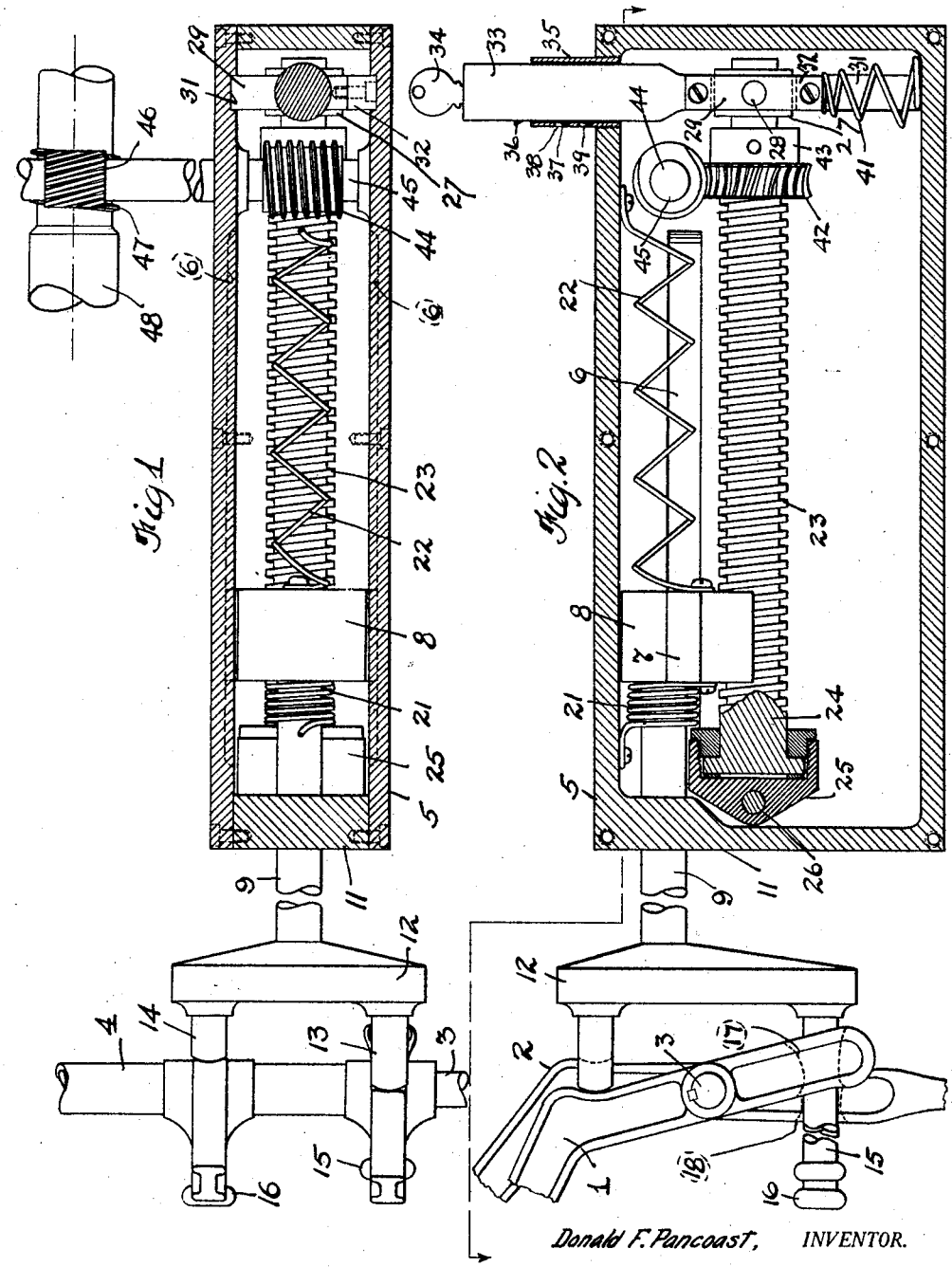

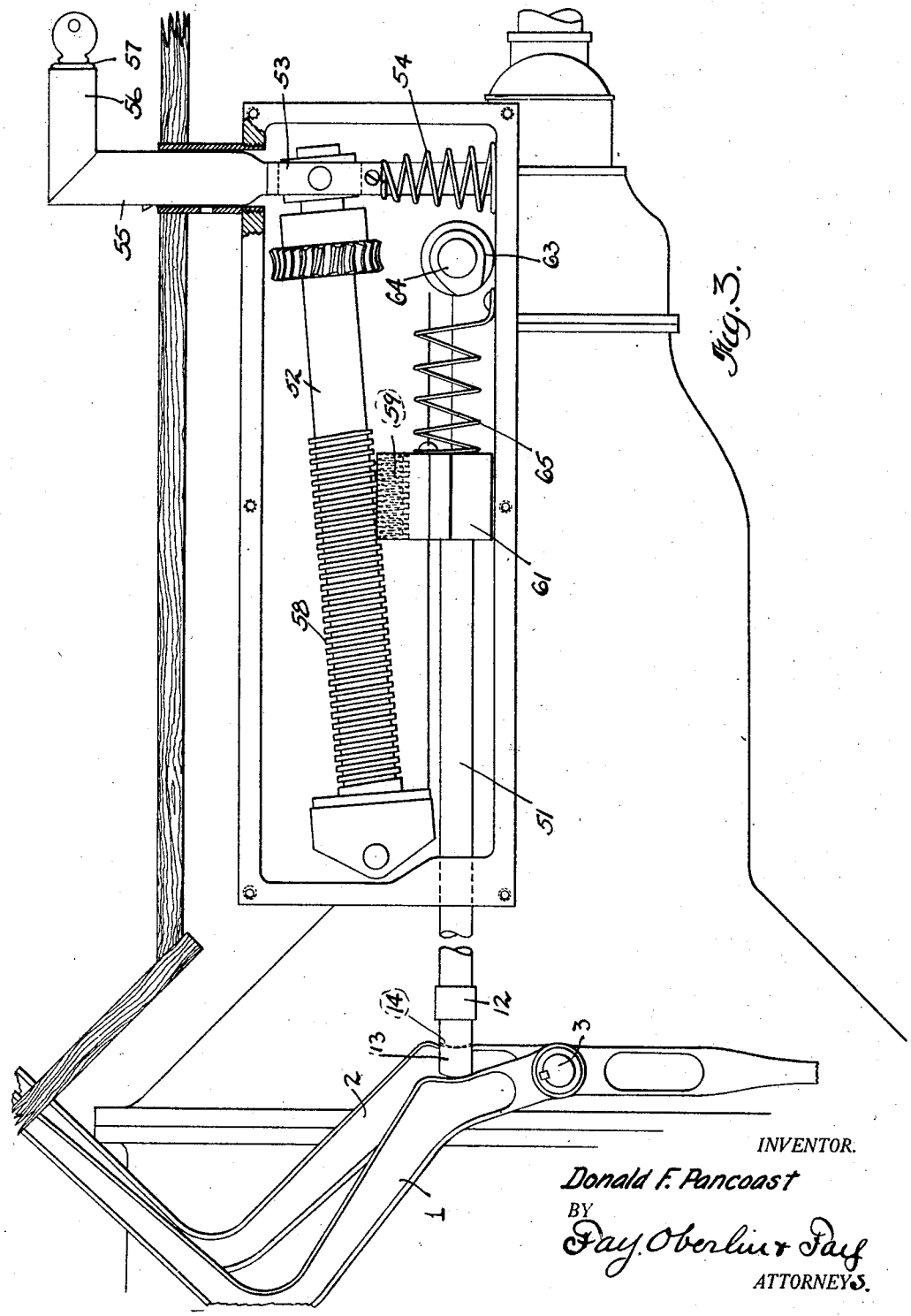

1,730,526

UNITED STATES PATENT OFFICE

DONALD F. PANCOAST, OF LAKEWOOD, OHIO

ANTITHEFT DEVICE

Application filed January 29, 1927. Serial No. 164,633.

This invention as indicated relates to an anti-theft device for automobiles. More particularly it comprises means adapted to co-operate with the clutch and brake mechanism of a motor car, or in some instances with the clutch, or the brake mechanism to move the same from normal running position to opposite position after a predetermined interval of time.

In areas of large population it is at present the custom to store automobiles in public garages and in open parking spaces as well as along the streets and in many instances there are regulations which prevent the owner locking the car so that the same cannot be shifted about on its own power. These regulations render ineffective anti-theft devices which permit the ignition, transmission lever, or steering wheel, to be locked, inasmuch as when the cars are parked in close order, it is necessary to shift them about on their own power in order to open the way for other cars to leave the place of storage. It has resulted, therefore, in leaving large numbers of expensive automobiles without any protection whatsoever against theft, and without adequate recourse against those having charge of their storage. In addition cars are often forcibly seized on public highways, especially after dark either solely to make away with the car or by lawbreakers seeking a means of escape.

The principal object of my invention is to provide an anti-theft device which will permit the shifting in a public garage or parking space that may be necessary to secure the maximum effective storage capacity of such space, without allowing sufficient range of travel for said automobile to permit the same to be driven any great distance on its own power. Another object of the invention is to provide a device which will be inexpensive to manufacture and install and easy to control by the owner or operator of an automobile, and which will adequately safe-guard the vehicle to which it is applied from being driven to any great distance from the point where such mechanism can be put ilnto effect. Other and further objects of the invention will appear in the course of the following description. To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a top plan view partially in section showing a modified form of apparatus embodying the principles of my invention; Fig. 2 is a side elevation partially in section of the apparatus illustrated in Fig. 1; and Fig. 3 is a side elevation of one form of apparatus embodying the principles of my invention.

As is clearly shown in Figs. 1 and 2 of the drawing, the clutch and brake pedals 1, 2 are mounted upon a transverse shaft 3, the clutch pedal being keyed to said shaft and the brake pedal being provided with a sleeve 4 engaged over such shaft. Said shaft and sleeve are provided with the usual links and levers to control the brakes and clutch respectively of an automobile. At a point beneath the floor boards of an automobile immediately behind the brake and clutch pedals, a casing 5 is positioned. Said casing is preferably of substantially rectangular form and of greater height than width and adjacent its upper portion is provided with a pair of slideways 6 preferably formed by cutting longitudinal channels in its side walls, said slideways are adapted to receive projecting lugs 7 formed on either side of a half nut 8 which is mounted on the rearward end of a slide bar 9 which projects through an aperture in the forward end 11 of said casing. Said slide bar is formed adjacent its forward end with a head member 12 carrying adjacent its upper edge a pair of forwardly projecting lugs 13, 14 in alignment respectively with the clutch and brake pedals. The lug for actuating the clutch pedal is formed of somewhat greater length than that for operating the brake pedal. Adjacent the lower edge of said head member, a pair of forwardly extending arms, 15, 16 are provided, said arms being adapted to engage through apertures 17, 18 formed through the clutch and brake pedals respectively. Said arms are of sufficient length not to interfere with the normal operation of said pedals and at their outer ends are provided with enlarged heads which are adapted to contact with the forward faces of said clutch and brake pedals. The bar for actuating the clutch pedal is of slightly less length than that for actuating the brake pedal in order that the clutch may be disengaged prior to the brake being made effective.

At either side of the half nut, coiled springs 21, 22 are provided, which, when positive means for holding said nut in any other position is not in operation, will move the same to a position approximately centrally of the casing. The springs as illustrated are each secured at one end to one side of the half nut and at their opposite ends to the casing wall. On its under side the half nut is provided with screw threads (not shown) of a size adapted to engage coacting screw threads 23 formed on a worm shaft 24. The worm shaft is adapted to be positioned centrally of the casing immediately beneath the slide bar and is journaled at its forward end in a pivot block 25 engaged upon a pin 26 supported transversely of said casing at its forward end. At its rearward end the worm shaft is mounted in a bearing 27 provided with trunnions 28 which are journaled in the side members of a slide plate 29. The slide plate comprises a member having a flat body portion adjacent its lower end, the side edges of which are engaged with vertical slideways 31 formed in the side walls of the casing. The central portion of said body member is formed with an opening, to provide for the reception of the trunnion bearing for the rearward end of the worm shaft. The body member may be formed with a detachable section 32 as shown. On the upper side of the plate a locking plunger 33 preferably of cylindrical cross-section is provided. Said plunger is preferably formed centrally of its upper end with a lock which may be operated by a key 34 in the usual manner. Said plunger is surrounded by a sleeve 35 which is adapted to project through the floor board of an automobile and is provided with a plurality of recesses 36, 37, for engagement with the locking slides 38, 39.

The plunger, as stated, is preferably provided with a pair of projecting locking teeth which are adapted to engage within the said notches formed in the projecting sleeve of the casing. Beneath the locking plate a coiled spring 41 is positioned which serves normally to maintain said plunger in raised position.

The worm shaft is provided adjacent its rearward end with a worm wheel 42 having a hub 43 which is pinned to said shaft, which worm wheel is adapted to be driven by a worm 44 carried on an extension shaft 45 suitably journaled in said casing and provided on its opposite end with a worm 46 engaging a worm wheel 47 actuated from the propeller mechanism 48 of the automobile.

It is believed that from the description of the construction of the apparatus shown in Figs. 1 and 2, the operation of this form of the device may be readily understood. As has been stated, the normal position of the half nut within the casing is at approximately a central point therein, this being the position to which it is normally shifted by means of the coiled springs engaged against the same at either side. The worm shaft when the automobile is in operation on its own power is moved downwardly at its rearward end so as to disengage the threads of the same from the threads of the half nut. In this position it is locked so that no interference with the operation of the automobile will take place.

When it is desired to make the anti-theft device effective, the key is applied to the upper end of the plunger and the worm shaft is permitted to be forced upwardly by the spring beneath the slide plate until its threads are in engagement with the threads of the half nut, and it is preferably automatically locked in this position. The teeth on the driving worm and worm wheel will also be interengaged through the raising of the rearward end of the worm shaft and said teeth are preferably formed of sufficient length to provide for a driving engagement of the worm shaft even though the half nut screw threads do not at first accurately mesh with the threads of the worm shaft. When so engaged, the worm shaft will be rotated in a clockwise or counter clockwise direction according to the motion of the propeller shaft of the automobile. After the engagement of the half nut with the threads of the worm shaft becomes effective, the actuating bar will be moved forwardly or rearwardly in accordance with the direction of motion of the vehicle. The length of the worm shaft and the pitch of its threads determines the rate of movement of the half nut and of the actuating bar. It is obvious that any desired range of travel of the automobile may be provided for before the anti-theft device becomes effective to stop the car. It may be found desirable, in most instances, to provide for a range of travel not exceeding a quarter mile after the device is locked in order to provide for an adequate degree of shifting radius within the carriage or parking space, but other distances may be provided for as indicated by conditions of use.

As the half nut is moved toward either end of the casing the actuating shaft brings the lugs or extensions carried on the head plate into contact with the clutch pedal and brake pedal of the automobile successively, first releasing the power and thereafter positively stopping the vehicle.

In addition to the use of the device in connection with the parking in a garage or parking space, the device may be tripped at a time when unauthorized parties forcibly eject the driver with a view to appropriating the car, or for the purpose of escaping arrest through the use of the car. If the locking device becomes immediately effective, it is likely that harm would come to the driver, as it might be apparent he had interfered with the mechanism of the car.

In order more readily to bring the mechanism into operation without detection, I have provided a modified form of construction as is shown in Fig. 3.

In this modified form of apparatus the mechanism embodies many of the elements heretofore described which are designated by the same reference characters. The slide bar 51, however, is placed beneath the worm shaft 52, and the slide plate 53, is normally held in raised position by means of the spring 54. The plunger 55 is not locked in its upper position but automatically locks when depressed. A lateral extension on the plunger 56 may be provided to form a member which may be easily engaged by the foot of the operator. The lock 57 may be installed in this lateral extension and will in this position be kept free from the entrance of grit or foreign matter.

When the plunger is depressed it will automatically lock in its lower position bringing the screw threads 58 of the worm shaft into engagement with the screw threads 59 of the half nut 61 and meshing the worm wheel 62 with the worm 63 on the shaft 64 actuated by the propeller shaft. The half nut instead of being held in central position by means of a pair of springs may be actuated by a single coiled spring 65, secured at one end to the nut and at the other end to the casing.

With the delayed action of the safety device it is possible to trip the mechanism into effective position with entire safety as the fact that such mechanism is in operation will not be discoverable by the unauthorized user of the car. When the range of travel of the car is known, there should be little difficulty in locating it and steps may at once be taken for its recovery.

Other modes of applying the principle of my invention may be employed instead of the one explained, change being made as regards the mechanism hereindisclosed, provided the means stated by any of the following claims or the equivalent of such stated means be employed.

I therefore particularly point out and distinctly claim as my invention:

1. An apparatus of the character described having in combination with a control member for an automobile, an actuating member for said control member, means associated with the transmission mechanism for making said actuating member effective after a predetermined interval, and a depressible automatically locked plunger means for controlling said last named means.

2. An apparatus of the character described having in combination with a control member for an automobile, means for moving said member into operative position, and means associated with the propeller shaft for moving said last named means after a predetermined interval of time.

3. An apparatus of the character described having in combination with the clutch and brake mechanism of an automobile, an actuating bar adapted to move said clutch mechanism to disengaged position, and said brake mechanism from disengaged to brake-applying position, and means for moving said actuating bar from a neutral position into effective contact with said brake and clutch mechanism after a predetermined interval of time.

4. An apparatus of the character described having in combination with the clutch and brake mechanism of an automobile, an actuating bar adapted to move in successive steps, said clutch mechanism to disengaged position, and said brake mechanism from disengaged to brake-applying position, and means for moving said actuating bar from a neutral position successively into effective contact with said brake and clutch mechanism after a predetermined interval of time.

5. An apparatus of the character described having in combination with a clutch mechanism of an automobile, an actuating bar adapted to move said clutch mechanism to disengaged position, and means for moving said actuating bar from a neutral position into effective contact with said clutch mechanism after a predetermined interval of time.

6. An apparatus of the character described having in combination with a brake mechanism of an automobile, and actuating bar adapted to move said brake mechanism to disengaged position, and means for moving said actuating bar from a neutral position into effective contact with said brake mechanism after a predetermined interval of time.

7. An apparatus of the character described having in combination with a brake or clutch mechanism for an automobile, an actuating member adapted to be moved into contact with said mechanism, a traveling half nut rigidly mounted on the rearward end of said actuating member, a worm shaft rotatably mounted parallel to and spaced from said actuating shaft and adapted to be engaged by the threads of said half nut, a worm wheel carried by said worm and adapted to engage a driving worm connected with the propeller shaft of said automobile, a pivotal support for the forward end of said worm shaft about which the rearward end of said shaft may be moved, a journal for the rearward end of said shafts, said journal carrying trunnions, a slide plate adapted to be engaged through the floor boards of the automobile and carrying said journal, and locking means for said slide plate.

8. An apparatus of the character described having in combination with a brake or clutch mechanism for an automobile, an actuating member adapted to be moved into contact with said mechanism, a traveling half nut rigidly mounted on the rearward end of said actuating member, a worm shaft rotatably mounted parallel to and spaced from said actuating shaft and adapted to be engaged by the threads of said half nut, a worm wheel carried by said worm and adapted to engage a driving worm connected with the propeller shaft of said automobile, a pivotal support for the forward end of said worm shaft about which the rearward end of said shaft may be moved, a journal for the rearward end of said shaft, said journal carrying trunnions, a slide plate adapted to be engaged through the floor boards of the automobile and carrying said journal, a spring for holding said slide plate in worm disengaging position, and automatic locking means for said slide plate when moved against said spring.

Signed by me this 14th day of January, 1927.

DONALD F. PANCOAST.